MEMORY CELL

SPECIAL FLAG CELL

0° TRANSFER ELEMENT

π° TRANSFER ELEMENT

DIRECTIONAL COUPLER 114

COUPLER 130

United States Patent Office 3,445,821

Patented May 20, 1969

3,445,821

HIGH-SPEED NON-DESTRUCTIVE READ OUT CONTENTS ADDRESSABLE MEMORY AND ELEMENTS THEREFOR

Luther D. Rudolph, Manlius, Paul K. Blackwell, Jr., Peterboro, and Hugh A. Hair, Liverpool, N.Y., assignors to Research Corporation, New York, N.Y., a nonprofit corporation of New York Filed Mar. 30, 1967, Ser. No. 627,260

Int. Cl. G11b *13/00*

U.S. Cl. 340—172.5 38 Claims

ABSTRACT OF THE DISCLOSURE

In a data processing system, a central processor operates in conjunction with a contents addressable memory. The contents addressable memory is word oriented and comprises a matrix of cells arranged in word lines (rows) and bit line columns. Each cell has three carrier signal terminals. Each row of the matrix is associated with a word storage register. The cells in each row are divided into sets of address cells, information bits storage cells, and flag bit cells. A flag register buffer interfaces the flag bit cells and the processor, a word register buffer interfaces the information bit storage cells and the processor and an address register buffer interfaces the address cells and the processor. Bit carrier signal lines connect the associated buffer and the first terminals of each cell in each bit line, respectively. A reference carrier-signal transmission line, connected to a source of carrier signals, is connected to the third terminal of each cell. Word carrier-signal transmission lines are connected to the second terminals of each cell in each word line, respectively.

Each of the information bit storage cells and each of the flag bit storage cells include controllable two-stable state phase shifting means. The stable states represent the logic value of the bits stored in the cells. Carrier signals are transferred from the first terminal to the second terminal of the cells in accordance with the phase of the carrier signal received at the first terminal and the state of the phase shifting means; and carrier signals are transferred from the second terminal to the first terminal, the phase of the signals at the first terminal depend on the phase of the signals received at the second terminal and the state of the phase shifting means.

BACKGROUND OF THE INVENTION

This invention pertains to memory devices and more particularly to high-speed non-destructive read out memory systems and elements of such systems.

There is a demand for high-speed non-destructive read out memory systems for use as associative or contents addressable memories. Generally, such memories require the location of a unit of information stored in a memory device solely on the basis of a portion of information in the unit of information. However, most memory systems today are either random access memories or serial access memories. In random access memories such as conventional magnetic core matrices each storage register of the memory is an addressed "pigeonhole." The contents of a register are obtained by specifying the fixed address of a "pigeonhole." In serial access memories such as magnetic drums each sector of a track acting as a storage register is assigned an address number with respect to a fixed fiducial mark on the back. The storage register is located by counting sectors from the fiducial mark to obtain the address number. While such memories are desirable for many data processing problems, there are other problems arising in pattern recognition, file maintenance, etc. which require the locating of stored data solely on the basis of the information content of the data.

As a simple example consider an insurance file maintenance problem. Assume one wants to locate all policy holders living in Syracuse, N.Y. It would be necessary to interrogate serially each of the storage registers of the memory for the home address of the policy holders. Clearly with serial access type memories this would be a time consuming operation. While the operation would be speeded up by a systematic search of a random access magnetic core matrix type memory, the destructive read out characteristic of such memories would require regeneration and rerecording of at least the inappropriate storage registers.

While this is a mundane example of the need for a contents addressable memory more state-of-the-art uses can be found in "Contents Addressable and Associative Memory System—A Survey," by A. G. Hanlon, IEEE Transactions of Electronic Computers, vol. EC–15, No. 4, August 1966.

Presently proposed contents addressable memories are implemented by various devices relying on the use of pulse-script signals and lumped constant elements which limit their speed of operation.

It is accordingly a general object of the invention to provide an improved memory system which is contents addressable.

It is another object of the invention to provide an improved contents addressable memory system that is operable at ultra-high speeds.

It is a further object of the invention to provide a non-destructive readout memory system.

It is a further object of the invention to provide a memory system which is operable with microwave carrier signals and employs primarily distributed parameter devices.

Briefly, the invention contemplates a memory system including a matrix of three-terminaled memory cells arrayed in word lines (rows) and bit lines (columns). Each of the cells includes a controllable phase shifting means and has the property of transmitting or not transmitting a received carrier signal in accordance with a relationship between the state of the phase shifting means and the phase of the carrier signal. Bit carrier-signal transmission lines are connected to corresponding first terminals of each of the memory cells in each bit line, respectively. Word carrier-signal transmission lines are connected to the second terminals of each of the memory cells in each word line respectively. Interrogating carrier signals having one of two phases can be transmitted by the bit carrier-signal transmission lines and passed to the word carrier-signal transmission lines and vice versa in accordance with the states of the phase-shifting means in the memory cells. Connected to each of the word carrier-signal transmission lines is a flag cell having phase shifting means that is settable to two possible states of phase shifting. The flag cells when receiving carrier signals from the word carrier-signal transmission lines register the fact that specific word lines of memory cells (Word registers) have been located for accessing.

A feature of the invention is a memory plane in the form of a matrix of memory cells which are settable by pulse signals (DC signals) and are interrogated by carrier signals.

Another feature of the invention is a memory cell including a controllable phase-shifting means with two stable states and signal control transfer means connected in series between a pair of carrier-signal transfer terminals. Carrier signals received at one of the terminals is transmitted from the other of the terminals only when there is a given relationship between the phase of the received carrier signal and the stable state of the phase-shifting means.

Another feature of the invention is a bilateral encoder-decoder utilizing phase shifting means and operating on carrier signals.

The system and its elements are ideally suited for the processing of information represented by the phase of carrier signals and particularly microwave carrier signals. In addition, major units of the system are ideally suited for monolithic printed circuit fabrication techniques utilizing passive elements.

Other objects, features and advantages of the invention will be apparent from the following detailed description, when read with the accompanying drawings which set forth, by way of example and not limitation, the presently contemplated embodiments of the invention.

Figure 1:
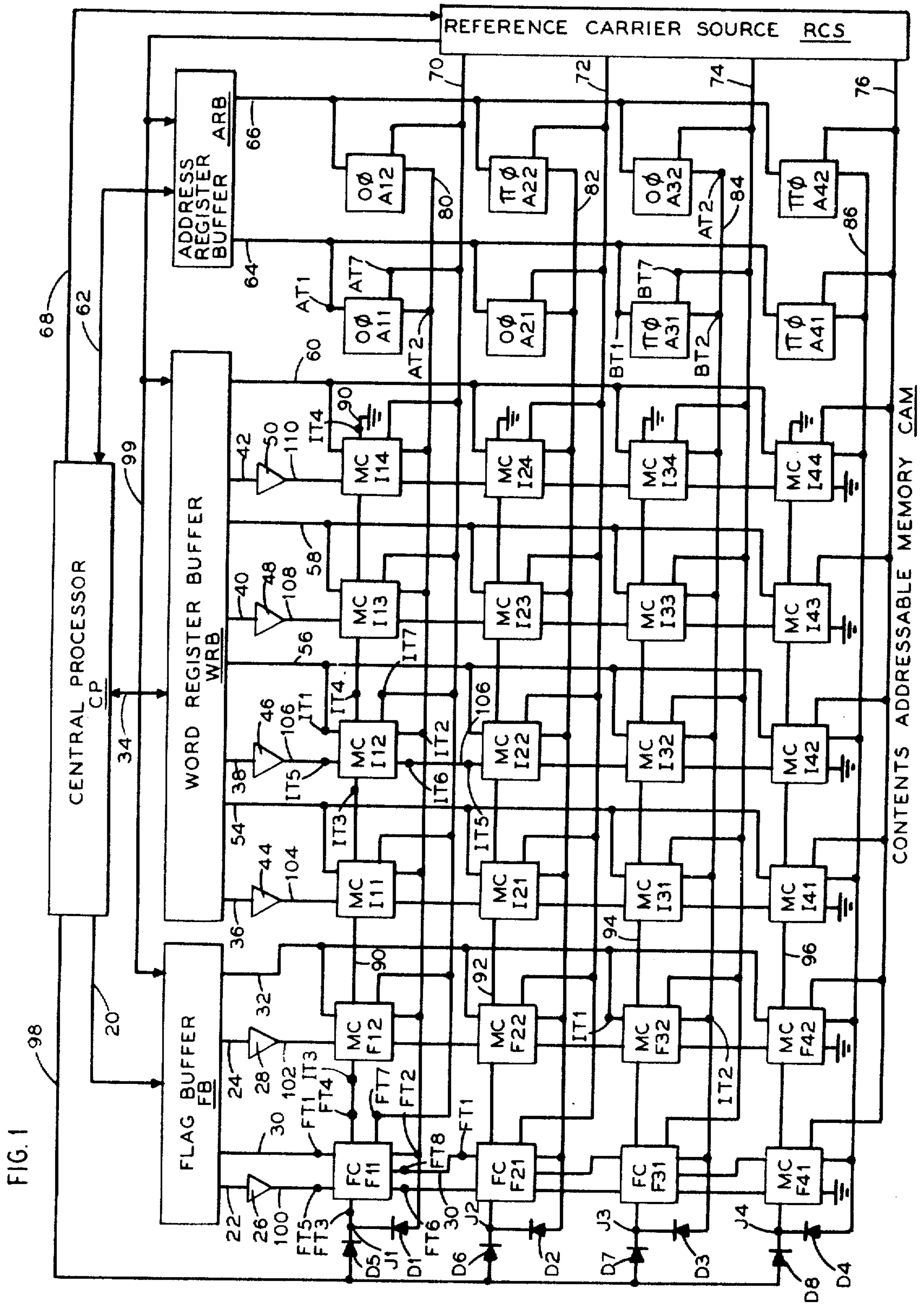
FIG. 1 shows symbolically a data processing system utilizing a contents addressable memory in accordance with the invention.

A data processing system is shown in FIG. 1 for processing words of information represented by coded combinations of bits having one of two logic values such as "1" and "0." The bits can be represented by pulse script signals, i.e., the presence of a pulse having one polarity, say positive, represents the binary "1" and the absence of a pulse, or the presence of a pulse of an opposite polarity, represents the binary "0." The bits can also be represented in phase script wherein one phase of a carrier signal represents the binary "1" and the opposite phase of the carrier signal represents binary "0."

The data processing system comprises a central processor CP and a contents addressable memory CAM which are interfaced by a flag buffer FB, a word register buffer WRB and an address register buffer ARB. The control processor CP can be any general purpose processor of the stored program type which is capable of performing the usual arithmetic and logic operations on data under control of the program. The central processor can operate on pulse-script represented words. Since such processors are so well known and since they form no part of the invention, they will not be discussed in detail. The contents addressable memory CAM is a storage module for the central processor. The information in the memory CAM is represented, generally, by phase-script signals. The buffers FB, WRD and ARB permit the conversion between pulse-script and phase-script representations of the information flowing between the memory CAM and the processor CP.

In particular the flag buffer FB receives programmed pulse-script signals representing logic values, via lines of cable 20, from central processor CP, and transmits either pulse signals of one of two polarities representing the logical values (DC signals of given duration greater than several carrier-signal periods) from lines 22 and 24 to line drivers 26 and 28 or carrier signals of a given phase to bit carrier-signal transmission lines 30 and 32 dependent on the particular operation to be performed as indicated by control signals from the processor. Word register buffer WRB is a bi-directional device which communicates with central processor CP via cable 34. Processor CP transmits either control signals or information word signals in pulse-script representation via lines of the cable 34 to buffer WRB. Buffer WRB transmits information word signals in pulse-script representation via cable 34 to processor CP. Included in buffer WRB are means for receiving from processor CP information word signals in pulse-script representation, and, according to the type of operation to be performed as indicated by a control signal from processor CP, transmitting pulse signals of one of two polarities in accordance with the logic values represented by the received signals via lines 36, 38, 40 and 42 to line drivers 44, 46, 48 and 50 or carrier signals having one of two phases in accordance with the logic values of the received signals to bit carrier-signal transmission lines 54, 56, 58 and 60. In addition buffer WRB includes means for receiving phase-script carrier signals from lines 54, 56, 58 and 60 and transmitting pulse-script signals via lines of cable 34 to processor CP. Address register buffer ARB communicates with processor CP via lines of cable 62. Buffer ARB includes means for receiving pulse-script signals from processor CP via lines of cable 62 and transmitting carrier signals having one of two phases in accordance with the logic values represented by the received signals to carrier-signal transmission lines 64 and 66, and means for receiving phase-script carrier signals from transmission lines 64 and 66 and transmitting pulse-script via lines of cable 62 to processor CP.

The contents addressable memory CAM comprises: a reference carrier source RCS which generates carrier signal having a given phase to each of the reference carrier signal transmission lines 70, 72, 74 and 76 under control of signals on line 68 from processor CP; and a matrix of cells arrayed in word lines (rows) and bit lines (columns), as shown in FIGURE 1. By way of example, memory CAM provides storage for four words each having four bits. Of course, in practice, such a memory would store many more words each having many more bits. In accordance with the example there are four word lines to the matrix. The bit lines of the matrix are divided into three groups; two flag bit lines, four information storage bit lines, and two address bit lines. Associated with the intersection of each word line with each bit line of the matrix is a cell. There are three classes of cells: flag cells, information bit storage cells, and address cells. The information bit cells form a four-row, four-column sub-matrix to provide four four-bit storage word registers; the address cells form a four-row two-column matrix to provide an encoder-decoder for identifying and locating particular storage word registers; and the flag cells form a four-row two-column submatrix to provide two-bit flag registers for each of the storage word registers.

A typical MC memory cell 112 (see also FIG. 2A) is an element having the following properties. It includes a controllable phase shifting means (connected between carrier signal transfer terminals IT1 and IT2) having two stable states each of which is associated with one of the two logic values. The phase shifting means can be switched to a specific one of the states when a current pulse (a DC signal of given duration) passes between terminals IT3 and IT4. The specific state to which it switches is determined by the polarity of a current pulse passing through terminals IT5 and IT6. There is also a reference carrier-signal receiving terminal IT7. The cell also includes means which control the transfer of carrier signals from terminal IT1 to IT2 in accordance with a relationship between the state of the phase shifting means and the phase of carrier signals received at terminal IT1. In addition, carrier signal received at terminal IT2 is transmitted to terminals IT1 and IT7; the signals at the latter two terminals will have a phase relation determined by the state of the phase shifting means.

The following tables summarize the operation of the cell.

TABLE 1

| Inputs | | | |
|---|---|---|---|
| IT1 | IT7 | State of phase shifting means | Output IT2 |
| +1 | +1 | +1 | 0 |
| −1 | +1 | +1 | −1 |
| +1 | +1 | −1 | −1 |
| −1 | +1 | −1 | 0 |

TABLE 2

| Input IT2 | State of phase shifting means | Outputs | |
|---|---|---|---|
| | | IT7 | IT1 |
| +1 | +1 | −1 | +1 |
| +1 | −1 | −1 | −1 |

Now, +1 and −1 represent the two logic values "1" and "0," respectively. In addition, +1 represents one of the phases of carrier signal, while −1 represents the other or opposite phase of carrier signal. Likewise, +1 and −1 also represent the two states of the phase shifting means, respectively. (Furthermore +1 represents one polarity of DC signal and −1 the opposite polarity of DC signal). The "0" represents the absence of a carrier signal or a DC signal. This convention will be employed throughout the disclosure. The MC memory cells are used for all cells $I_{ij}$ in the bit storage register sub-matrix and for the cells F*i*2 of the second row of the flag register sub-matrix.

Figure 3A:
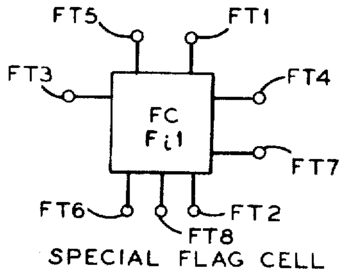
FIG. 3A is the symbolic representation of a special flag cell used in the memory of FIG. 1.

The FC flag cells F*i*1 (see also FIG. 3) are very similar to the MC memory cells. Therefore, only the prefix character of the reference number will change from I to F to indicate similar terminals. The only other difference is that when a carrier signal is received at carrier-signal transfer terminal FT1 it is transmitted from carrier-signal transfer terminal FT2 if the phase of received carrier signal and the state of the phase shifting means represent different logic values, and is transmitted from carrier-signal transfer terminal FT8 if the phase of the received carrier signal and the state of the phase shifting means represent the same logic values.

The cells of the address register sub-matrix are of two types. The 0⌀ cells (see also FIG. 4A) have carrier-signal transfer terminals AT1 and AT2, and a reference carrier-signal receiving terminal AT7 which receives a carrier signal of given phase. The terminal AT2 only transmits a carrier-signal if, and only if, the phases of the carrier-signals received at terminals AT1 and AT7 are different. In addition, a carrier-signal received at terminal AT2 is transmitted without phase change by terminal AT1. The π⌀ address cells (see also FIG. 5A) have carrier-signal transfer terminals BT1 and BT2, and a reference carrier-signal receiving terminal BT7. The terminal BT2 transmits a carrier signal if, and only if, the carrier signals received at terminals BT1 and BT7 have the same phase. In addition a carrier-signal received at terminal BT2 is transmitted by terminal BT1 with a change to the opposite phase.

The signal interconnections among the cells will now be described. Each of the reference carrier-signal transmission lines 70, 72, 74 and 76 is connected to the reference carrier-signal receiving terminals *k*T7 of all of the cells in each row of the matrix, respectively. For example, the line 70 is connected, in parallel, to: terminals AT7 of address cells A11 and A12; terminals IT7 of information bit cells I11, I12, I13 and I14; terminal FT7 of flag cell F12 and terminal FT7 of flag cell F11. Each of the bit carrier-signal transmission lines 30, 32, 54, 56, 58, 60, 64 and 66 is connected to the first carrier-signal transfer terminals *k*T1 of each of the cells in each bit (column) line of the matrix. For example, line 60 is connected, in parallel to the terminals IT1 of MC cells I14, I24, I34 and I44. However, line 30 connects the FC flag cells in series. The first segment of line 30 connects an output of flag buffer FB to the terminal FT1 of cell F11; the next segment of line 30 connects the terminal FT8 of cell F11 to terminal FT1 of cell F21; etc. There is a word carrier-signal transmission line for each word line of the matrix. Each of the word carrier-signal transmission lines 80, 82, 84 and 86 is connected to the carrier-signal transfer terminals T2 of all of the cells in one of the word lines of the matrix. For example, line 80 is connected, in parallel, to terminals IT2 of MC cells F12, I11, I12, I13 and I14, and terminal FT2 of FC cell F11. There is a word DC signal line for each word line of the matrix. Each of the word DC signal lines interconnects, in series, the terminals T3 and T4 of the FC cells and MC cells in one word line of the matrix. For example, one segment of line 90 connects junction J1 to terminal FT3 of cell F11, another segment of line 90 connects terminal FT4 of cell F11 to terminal IT3 of cell F12, . . . , the last segment of line 90 connects terminal IT4 of cell I14 to ground. Diodes D1 to D4 connect lines 80, 82, 84 and 86 to junctions J1 to J4, respectively. Diodes D5 to D8 connect line 98 from central processor CP to junctions J1 to J4, respectively. Each of the DC signal lines 100, 102, 104, 106, 108 and 110 serially interconnects the terminals T5 and T6 of the FC and MC cells in one bit line of the matrix. For example, the first segment of line 106 connects the output of driver 46 to terminal IT5 of cell I12, the next segment of line 106 connects the terminal IT6 of cell I12 to the terminal IT5 of cell I22, . . . , the last segment of line 106 connects the terminal IT6 of cell I42 to ground.

Each of the different modes of operation of the system will now be described.

(*A*) *The read operation*

In this operation the contents of an address specified word register of memory CAM are fed to the processor CP.

*Step* 1.—Central processor CP transmits a pulse signal via line 98 and diodes D5 to D8 to word DC signal lines 90, 92, 94 and 96 to permit switching of the phase shifting means in the FC and MC cells. However, none of these cells can switch unless they receive coincident pulse signals on their bit DC signal lines. At the same time central processor CP transmits pulse signals via lines of cable 20 and flag buffer FB and drivers 26 and 28 to bit DC signal lines 100 and 102. The pulse signals on lines 100 and 102 have such a polarity to switch the phase shifting means of all the flag cells F*ij* to +1.

*Step* 2.—Lines 98 and 102 are deenergized. Central processor CP then simultaneously transmits a signal on line 68 causing source RCS to transmit +1 phased carrier signals on lines 70, 72, 74 and 76, a signal via one of the lines of cable 20 and flag buffer FB which causes line 102 to transmit a pulse having a value of −1, and transmits signals representing the address of the desired word register via lines of cable 62 to address register buffer ARB. The following table lists the addresses of the word registers.

TABLE 3

| Word register address | Signal on— | | Word register |
|---|---|---|---|
| | Line 64 | Line 66 | |
| 0 | +1 | +1 | Memory cells I11, I12, I13, I14. |
| 1 | +1 | −1 | Memory cells I21, I22, I23, I24. |
| 2 | −1 | +1 | Memory cells I31, I32, I33, I34. |
| 3 | −1 | −1 | Memory cells I41, I42, I43, I44. |

Any address which does not match the location of the desired address causes the associated flag cell to be set to −1. In particular, assume the desired word register is 2. Line 64 transmits a carrier signal having a −1 phase and line 66 transmits a signal having a +1 phase. Cells A11, A21, A22 and A42 transmit carrier signal received at their terminals AT1 to their terminals AT2 (note neither cell A31 nor cell A32 transmits any carrier signal). Accordingly, carrier signals are transmitted via lines 80, 82 and 86 via diodes D1, D2 and D4 to become DC signals on lines 90, 92 and 96, respectively. Because of the coincidence of DC signals, cells F12, F22 and F42 switch to the −1 state (Note cell F32 remains in the +1 state).

*Step* 3.—Lines 64, 66 and 102 are deenergized. Then central processor CP transmits a signal via one of the lines of cable 20 which causes line 32 to transmit a carrier signal having the −1 phase. Since cells F12, F22 and F42 are in the −1 state they transmit no signals. However, cell F32 is in the +1 state and the carrier signal received at its terminal IT1 is transmitted from its terminal from its terminal IT2 to line 84 (see Table 1). This carrier signal is received by terminals IT2 of cells I31, I32, I33 and I34. These cells then transmit from their terminals IT1 to lines 54, 56, 58 and 60 carrier signals having phases related to the states of their phase shifting means (see Table 2). These phase-script carrier signals, representing the contents of word register 2, are converted by word register buffer WRB to pulse-script signals and fed via lines of cable 34 to central processor CP.

(*B*) *The write operation*

In this operation the contents of an address specified word register of memory CAM are updated by information from the central processor CP.

*Step 1.*—The same as Step 1 of the read operation.

*Step 2.*—The same as Step 2 of the read operation.

*Step 3.*—Assuming that the contents of word register 2 are to be updated, then at this point the phase shifting means of flag cell F32 is in the +1 state and that of flag cells F12, F22 and F42 are in the −1 state. Lines 64, 66 and 102 are deenergized. Then central processor CP transmits a signal via one of the lines of cable 20 which causes line 32 to transmit a carrier signal having the −1 phase. Coincidental therewith central processor CP transmits signals via lines of cable 34 to write register buffer WRB for energizing drivers 44, 46, 48 and 50 in accordance with the logic values of the bits of the word to be written. Accordingly, lines 104, 106, 108 and 110 will transmit DC signals of +1 for logic value "1," −1 for logic value "0" and 0 (or no signal) if the bit is masked (remains unchanged). The coincidence of the DC signals on word DC signal line 94 with the DC signals on the bit DC signal lines 104, 106, 108 and 110 will set the phase shifting means in the cells 131, 132, 133 and 134 in accordance with the logic values represented by the signals on the bit DC signal lines.

(*C*) *Write-on-match operation*

The contents of a selected word register is updated. The word register is selected in accordance with its previous contents. The register is contents addressed.

*Step 1.*—Same as Step 1 of the read operation.

*Step 2.*—Lines 98 and 102 are deenergized. Central processor CP transmits a −1 signal, central processor CP also transmits signals representing the "contents defined address" via lines of cable 34 to word register buffer WRB. The bit carrier-signal transmission lines 54, 56, 58 and 60 transmit phase-script carrier signals to the terminals IT1 of the information bit storage cells. The carrier signals will have a phase of +1 for logic value "1," −1 for logic value "0" and there will be no carrier signal for a marked bit. Assume that only the word register 2 has the desired contents, then carrier signal will appear on the word carrier signal lines 80, 82 and 86 but no carrier signal will appear on line 84. This occurs because there will be at least one bit mismatch in each of word registers 0, 1 and 3, but no bit mismatches occur in word register 2. By a mismatch is meant that the phase of the carrier signal received at terminal IT1 of the cell represents a logic value different from the logic value represented by the state of the phase shifting means of the cell. (See Table 1.) Thus flag cells F12, F22, and F42 are set to −1 and flag cell F32 remains at +1.

*Step 3.*—The same as Step 3 of the write operation.

It should be noted that more than one word register can be simultaneously selected and updated with the same information using this operation.

(*D*) *The resolve operation*

In the resolve operation word registers are selected in accordance with their contents and the address of the lowest (or highest) addressed of the so selected word registers is transferred to the central processor.

*Step 1.*—The same as Step 1 of the write operation.

*Step 2.*—The same as Step 2 of the write-on-match operation except instead of line 102 transmitting a −1 valued DC signal, line 100 transmits a −1 valued DC signal. Therefore, the phase shifting means of flag cells F11, F21 and F41 are set to −1 and that of flag cell F31 remains at +1.

*Step 3.*—Lines 100, 54, 56, 58 and 60 are deenergized. Central processor CP transmits a signal via one of the lines of cable 20 to flag buffer FB which in turn transmits a −1 phased carrier signal to bit carrier-signal transmission line 30. This carrier signal is received by terminal FT1 of flag cell F11. Since the logic value represented by the carrier signal and the state of the phase shifting means of cell F11 are equal, no carrier signal is transmitted from terminal FT2 but is transmitted from terminal FT8 of cell F11. This carrier signal is received by terminal FT1 of cell F21 and, because of the equality of logic value representation, the carrier signal is transmitted from terminal FT8 of cell F21. The so transmitted carrier signal is received by terminal FT1 of cell F31. Now because of the mismatch or inequality of the logic value represention, the carrier signal is transmitted from terminal FT2 and not terminals FT8 of cell F31. The carrier signal transmitted from terminal FT2 of cell F31 is received by line 84 and fed to terminals BT2 and AT2 of address cells A31 and A32, respectively. It should be noted that the phase of this signal is −1. The terminal BT1 of cell A31 accordingly transmits a carrier signal having a phase of +1 via line 64 to address register buffer ARB, and the terminal AT1 of cell A32 transmits a carrier signal having a phase of −1 via line 66 to buffer ARB. Buffer ARB inverts the logic values of these signals and changes them to pulse-script for transmission via lines of cable 62 to processor CP to indicate the address of the so selected word register. Incidentally, it should be noted that the contents of the so selected register are also fed to the word register buffer WRB.

It should also be noted that after Step 2 of the write-on-match operation it is possible to obtain an indication of the approximate number of matches. If a carrier signal having a phase of −1 is then applied to line 32, then, the amplitude of the signal appearing on line 30 corresponds to the number of matches.

The various components of the system will now be discussed in greater detail. The buffers FB, WRB and ARB contain well known circuit elements. For instance, when the buffers require means for transmitting a DC signal to one of the drivers in response to a DC signal received from the processor, logically only a jumper is required between the line of the cable which connects the processor to the buffer and the line which connects the buffer to the driver. Where the buffer requires means to transmit a carrier signal to a bit carrier-signal transmission line in response to a DC signal received from the processor, the DC signal can operate gated amplifiers which receive carrier signal via line 99 from reference carrier source RCS. There can be a pair of gated amplifiers for each means. One gate amplifier is turned on by −1 valued DC signals to generate −1 phased carrier signals. The other gated amplifier is turned on by +1 valued DC signals to generate +1 phased carrier signals. Where the buffer requires means to convert phase-script carrier signals to pulse-scripts DC signals, conventional phase detectors which receive the phase-script carrier signals from the bit carrier-signal transmission lines and a reference carrier signal from line 99, and transmit DC signals in accordance with the phase relationship of the received signals can be employed.

Figure 2A:
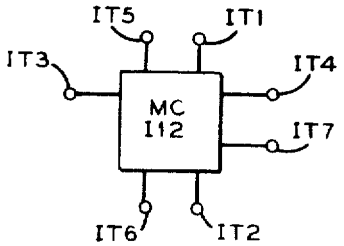
FIG. 2A shows the symbol for a memory cell of the memory of FIG. 1.
Figure 2B:
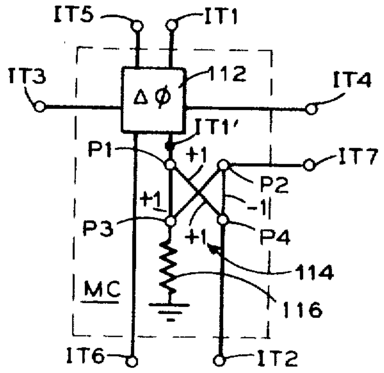
FIG. 2B is a schematic representation of the memory cell of FIG. 2A.

The schematic of the typical MC memory cell I12 of FIGS. 1 and 2A is shown in FIG. 2B comprising a controlled phase shifting means or phase shifter 112, a signal transfer control means or directional coupler 114 with a carrier-signal energy dissipation means or microwave resistor 116. Controllable phase shifter 112 can assume one of two possible stable states. In the first stable state (+1), carrier signals received at terminal IT1 are transmitted from terminal IT1′ inverted (not in the same phase); and carrier signals received at terminal IT1′ are transmitted from terminal IT1 without phase inversion. In the second stable state, carrier signals received at terminal IT1 are transmitted from terminal IT1′ without phase inversion, but carrier signals received by terminal IT1′ are transmitted from terminal IT1 with phase inversion. The terminals IT1 and IT1′ are carrier-signal transfer terminals. The state of the phase shifting means is established by coincident pulse signals (DC signals of given duration) transmitted between terminals IT3 and IT4 and between terminals IT5 and IT6. First, the state of the phase shifter 112 cannot be changed unless a pulse signal is transmitted between terminals IT3 and IT4. (In coincidence current memory terminology this is a word select signal.) Hence, terminals IT3 and IT4 can be called a priming terminal means or a permission control input means. The polarity of a pulse signal that is transferred from terminal IT5 to IT6 determines the state of phase shifter 112. If the signal has a +1 value then phase shifter 112 switches to the −1 stable state (if not already in that state); if the signal has −1 value then phase shifter 112 switches to the −1 stable state (if not already in that state). Thus terminals IT5 and IT6 can be called information input terminal means or state control input means. In addition, the combination of terminals IT3 to IT6 can be called recording terminal means.

The directional coupler 114 (also called a 180° hybrid or a 2 x 2 Butler matrix) is a passive, reciprocal device having first and second pairs of ports P1, P2 and P3, P4. A carrier signal received at port P1 splits equally and is received at ports P3 and P4 without a change in phase. A carrier signal received at port P2 splits equally and is received at port P3 without a change in phase but is received at port P4 with an inversion in phase. (Scaling factors have been ignored, since they do not concern the logic operation of the device.) Thus, if equiamplitude carrier signals are received by ports P1 and P2 the sum of the signals is transmitted from port P3 and the difference of the signals is transmitted from port P4. Since the coupler is reciprocal the input and output ports can be interchanged.

Port P1 is connected to terminal IT1′ of phase shifter 112; port P2 is connected to reference carrier-signal receiving terminal IT7; port P3 is connected to grounded resistor 116, and port P4 is connected to carrier-signal transfer terminal IT2. If the phases of the carrier signals received by ports P1 and P2 are the same, no carrier signal is transmitted from port P4; if the phases are different, then carrier signal is transmitted from port P4. If port P2 only receives a carrier signal having the +1 phase then the phase of the carrier signal received at port P1 determines whether or not signal is transmitted by port P4. Stated in another way, the presence or absence of signal at terminal IT2 indicates the phase of the signal received at port P1 which is dependent on the phase of the signal received by terminal IT1 and the state of phase shifter 112. Thus directional coupler 112 can be considered as a signal transfer control means.

Furthermore, because of the reciprocal nature of coupler 114 carrier signal can be received at terminal IT2 and transmitted from terminals IT1 and IT7. Signal received at terminal IT2 is fed to port P4 where it splits and is fed to ports P1 and P2 in an out of phase relation. The signal at port P1 then passes through phase shifter 112 whether it is phase shifted or not in accordance with the state of the phase shifter. Thus, by comparing the phases of the carrier signals transmitted by terminals IT1 and IT7 the state of the phase shifter can be determined. If the phases are different the phase shifter is in the +1 state; if the phases are the same the phase shifter is in the −1 state.

Figure 3B:
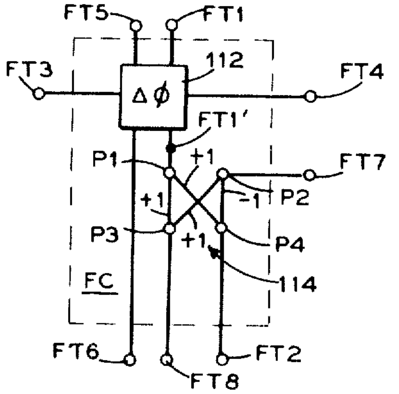
FIG. 3B is the schematic diagram of the flag cell of FIG. 3A.

The schematic representation of the FC special flag cell F*i*1 is shown in FIG. 3B. Since it is identical to the MC memory cell in most respects only the differences will be cited. In particular, port P3 is coupled to carrier-signal transfer terminal FT8 instead of to a grounded resistor. Thus when the phases of the carrier signals received at ports P1 and P2 are the same carrier signal is only transmitted from port P3 and when the phases are different carrier signal is only transmitted from port P4. Hence, if terminal FT7 receives a +1 phased carrier signal, then, if the logic value represented by the phase of the carrier signal received by the terminal FT1 and the logic value represented by the state of the phase shifter 112 are the same, a signal is transmitted from terminal FT8; if the logic values are different, a signal is transmitted from terminal FT2.

Figure 4A:
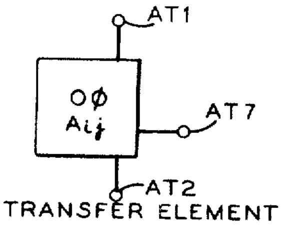
FIG. 4A shows the symbol for a 0° transfer element used in the memory of FIG. 1.
Figure 4B:
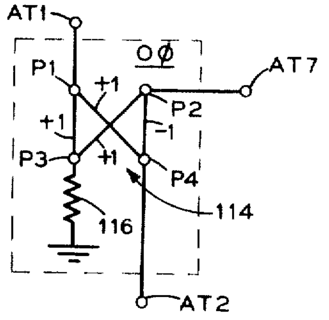
FIG. 4B is the schematic diagram for the transfer element of FIG. 4A.
Figure 5A:
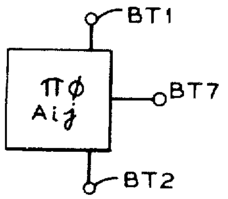
FIG. 5A shows the symbolic representation of the $\pi$° transfer element used in the memory of FIG. 1.
Figure 5B:
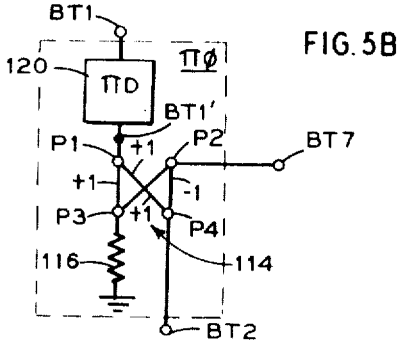
FIG. 5B shows the schematic diagram of the element of FIG. 5A.

The detailed schematic of the 0° transfer element A*ij* of FIG. 4A is shown in FIG. 4B comprising the directional coupler 114 and the resistor 116. Element A*ij* has: a carrier-signal transfer terminal AT1 connected to port P1 of coupler 114; a reference-carrier signal receiving terminal AT7 connected to port P2; and a carrier-signal transfer terminal AT2 connected to port P4. Port P3 is connected to grounded resistor 116. Since element A*ij* operates in exactly the same way as MC memory cell I12 of FIGS. 2A and 2B when the phase shifter 112 is in the +1 state its operation will not be described. The detailed schematic of the π transfer element A*ij* of FIG. 5A is shown in FIG. 5B comprising the directional coupler 114, the resistor 116 and the fixed 180° phase shifter 120. The π transfer element A*ij* has a terminal BT1 connected via phase shifter 120 to port P1 of coupler 114; a reference-carrier signal receiving terminal BT7 connected to port P2; and a carrier-signal transfer terminal BT2 connected to port P4. Port P3 is connected to grounded resistor 116. Since the element operates in exactly the same way as MC cell I12 of FIGS. 2A and 2B when the phase shifter 112 is in the −1 state its operation will not be described.

The physical components of the elements will now be described in greater detail.

Figure 6:
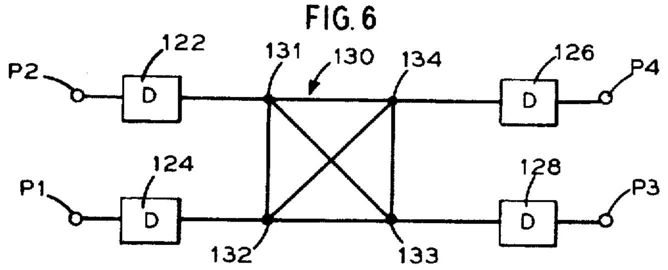
FIG. 6 shows the schematic representation of the directional couplers used in the cells and elements of FIGS. 2 to 5B.

Directional coupler 114 is shown schematically in FIG. 6 comprising phase delay elements 122, 124, 126 and 128 and coupler 130. Coupler 130 has four ports 131, 132, 133 and 134. The coupler is linear and reciprocal. The coupler also has a given bandpass and has characteristic impedance at the ports. Unless otherwise indicated, the carrier-signal energy has frequencies within the bandpass of the coupler and the devices connected to the couplers have input and output impedances which match the characteristic impedance of the couplers. For the sake of definiteness the ports 131 and 132 are considered to be the input ports of the coupler and the ports 133 and 134 are considered to be the output ports of the coupler. Because of the reciprocal nature of the coupler, the input ports and output ports can be interchanged.

If a carrier signal is received at the first input port 131 the power or energy of the signal is split into two equal quantities. One quantity is fed to the first output port 133 and the other is fed to the second output port 134. The signal phase of the power transmitted from output port 133 is delayed by 90 electrical degrees or one-quarter of an operating wavelength from the signal phase of the power transmitted from output port 134. Thus, if the microwave power received at input port 131 is represented by the quantity A, the ports 133 and 134 transmit microwave energy having voltages represented by the quantities $$-\frac{1}{\sqrt{2}}jA \text{ and } \frac{1}{\sqrt{2}}A$$

respectively. Similarly, if a microwave signal is received at the second input port 132, the power of the signal is split into two equal quantities, one half of the power is fed to each of the output ports 133 and 134. The signal phase of the power transmitted from output port 134 is delayed by 90 electrical degrees or one-quarter of an operating wavelength from the signal phase of the power transmitted from output port 133. Thus, if the microwave power received at input port 132 is represented by the quantity B, the ports 133 and 134 transmit microwave power having voltages represented by the quantities $$\frac{1}{\sqrt{2}}B \text{ and } \frac{1}{\sqrt{2}}jB$$

respectively. If microwave-signal power is simultaneously applied to input ports 131 and 132, signal superposition occurs because the coupler is linear. Therefore, by using the above indicated terminology when microwave power received at input port 131 is represented by A and the microwave power received at input port 132 is represented by B, output port 133 transmits microwave power having a voltage represented by $$\frac{1}{\sqrt{2}}(-jA+B)$$

and output port 134 transmits microwave power having a voltage represented by $$\frac{1}{\sqrt{2}}(A-jB)$$

Hence, the names 3 db. coupler or 90 degree hybrid. Two points are worth repeating: (1) any power received at an input port is divided equally between the output ports; and (2) the signals transmitted by the output ports have a phase difference.

Now consider ports 131, 132, 133 and 134 to be signal transfer points. The input ports of directional coupler 114 are ports P1 and P2 and the output ports are ports P3 and P4. In order to obtain the proper signal-phase relationships between the signals transmitted from the output ports, combinations of the phasing devices 122, 124, 126 and 128 are used. The proper signal-phase relationships require that there be, both: (1) a 90 degree phase difference between the signals received at input port P2 and transferred to transfer point 131 and the signals received at input port P1 and transferred to transfer point 132; and (2) a 90 degree phase difference between the signals received at transfer point 134 and transferred to output port P4 and the signals received at transfer point 133 and transferred to output port P3. The first condition is satisfied by either introducing a 90 degree phase delay or introducing a 90 degree phase advance in the signal transferred from input port P2 to transfer point 131 while leaving the phase of the signal transferred from input port P1 to transfer point 132 unchanged. To obtain the 90 degree phase delay a quarter wavelength of transmission line or the like can be used as the phasing device 122 between input port P2 and transfer point 131 while input port P1 "merges" with transfer point 132. To obtain the 90 degree phase advance, a quarter wavelength of transmission line or the like can be used as the phasing device 122 between input port P2 and transfer point 131, while a half wavelength of transmission line can be used as the phasing device 124 between input port P1 and transfer point 132.

There are several ways for physically realizing the coupler 130. The most economically worthwhile way for large microwave-signal-processing systems is by using shielded (double ground plane) striplines or microstriplines.

Figure 7:
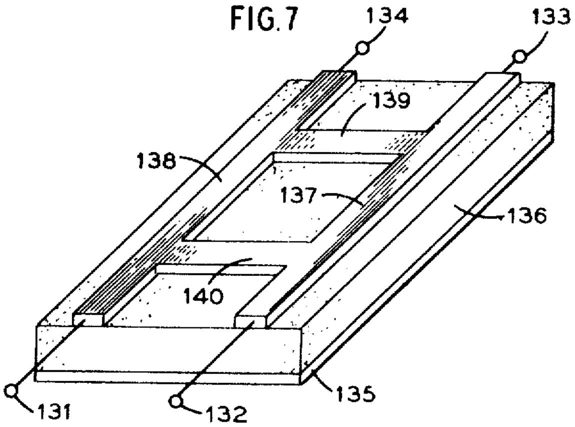
FIG. 7 is a perspective view of a physical realization of a position of the directional coupler of FIG. 6.

A microstripline embodiment is shown in FIG. 7 in the form of a branch-line coupler. Coupler 130 comprises a ground-plane element 135, a sheet of dielectric material 136 on the ground-plane element, and first and second linear conductors 137 and 138 on sheet 136. Linear conductor 137 electromagnetically cooperates with ground-plane element 135 to form a transmission line of the microstripline type; and linear conductor 138 electromagnetically cooperates with ground-plane element 135 to form another transmission line of the microstripline type. Linear conductors 137 and 138 are parallel and spaced from each other by one-quarter of an operating wavelength. Two further linear conductors 139 and 140 are on top surface of sheet 135. These conductors are mutually parallel, orthogonal to, and contact linear conductors 137 and 138. Conductors 139 and 140 are mutually spaced by one-quarter of an operating wavelength. Conductor 139 electromagnetically cooperates with ground-plane element 135 to form a transmission line of the microstripline type; and conductor 140 electromagnetically cooperates with ground-plane 135 to form another transmission line of the microstripline type. The characteristic impedance of the transmission lines associated with linear conductors 137 and 138 is $\sqrt{2}$ times less than the characteristic impedance of the transmission lines associated with conductors 139 and 140. The characteristic impedance is controlled by the thickness of sheet 136 or preferably by the width of the conductors.

An input port 131 is connected to one end of linear conductor 138; the other input port 132 is connected to one end of linear conductor 137. The output ports 133 and 134 are connected to the other ends of linear conductors 137 and 138, respectively. Power transfer between the transmission lines associated with linear conductors 137 and 138 is via the transmission lines associated with linear conductors 139 and 140.

The branch-line coupler 130 has the advantage of ease of fabrication. It is readily made by using present "printed circuit" techniques. For example, a standard printed-circuit substrate of glass, fiberboard or polyethylene has its surfaces covered with a conductor such as copper or silver. One surface is left unchanged to provide a ground-plane element. The other surface is photo-etched with the conductor pattern. The only possible limitation to the branch-like coupler is its bandwidth characteristic. It has a bandpass of approximately 10% of the operating frequency. However, except for specialized broadband applications this is no limitation.

For broadband-signal-processing applications one can employ devices such as those described in co-pending application Ser. No. 570,232, for Quasi Optical Signal Processing, filed Aug. 4, 1966, and assigned to the same assignee.

Figure 8:
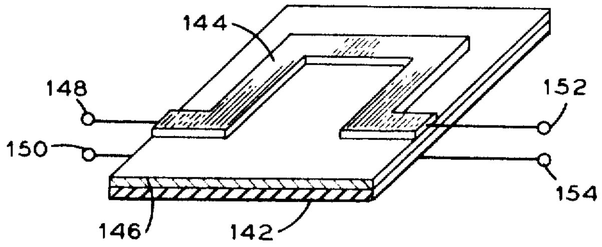
FIG. 8 is a perspective view of a physical realization of the fixed phase shifters used in the coupler of FIG. 6 and the transfer element of FIG. 5B.

The phasing devices 122, 124, 126 and 128 of FIG. 6 or the fixed phase shifter 120 of FIG. 5B is shown in FIG. 8 utilizing microstripline techniques. In particular the phase driver comprises a ground plane element 142 of conductive material and a signal conductor 144 of conductive material. Sandwiched between element 142 and conductor 144 is a spacer element 146 of dielectric material. The device is provided with input terminals 148 and 150 and output terminals 152 and 154. Any required phase shift or delay is obtained by selecting the related mechanical path length between terminals 148 and 152.

Before describing the details of phase shifter 112 some theory will be discussed.

In a guided-microwave-energy path the velocity of the flow of the microwave energy is a function of at least the permeability of the medium of the path. Therefore, changes in the medium permeability introduce changes in the velocity of energy flow. These changes in velocity can be equated to changes in the electrical length of the path. A change in the electrical path length is equivalent to a differential delay or phase-shift in the microwave signal propagated along the path. Hence, by knowing the available change of permeability in the path and then choosing a mechanical length for the path, any desired differential phase-shift can be obtained. It should be noted that any mechanical path will introduce a delay or phase-shift in the microwave energy solely by virtue of its mechanical length. The change in permeability in the path superimposes on this phase-shift a further phase-shift (a differential phase-shift). Throughout the text the phrase "phase-shift" means the differential phase-shift.

Changes in the permeability in the path are obtained by introducing a ferrite material in the path and then controlling the direction of magnetization of the ferrite material with respect to the direction of polarization of the RF (radiofrequency)-magnetic field component of the microwave energy flowing down the path.

For example, assume a microwave signal is transmitted along a guided-microwave-energy path with a circularly polarized, RF-magnetic field component wherein the axis and sense of rotation of that field is represented by a vector in a given direction. If a magnetic element is included in the path there can be an interaction between the domains of the magnetic element and the magnetic field of the microwave signal. In particular, when the magnetization vector, representing predominant alignment of the domains in a region of the magnetic element, has the same direction as the vector representing the axis and sense of rotation of the circularly polarized RF-magnetic field in that region, there is an interaction between the so-aligned domains and the magnetic field, and the permeability of that region changes. If the vectors are oppositely directed there is little interaction and the permeability remains relatively unchanged. Furthermore, orthogonality of the vectors results in little interaction. This condition represents the outer limits of the change in permeability. In those cases where the vectors are not colinear the magnetization vector can be resolved into a colinear and a transverse component with only the colinear component being involved in the interaction.

Figure 9:
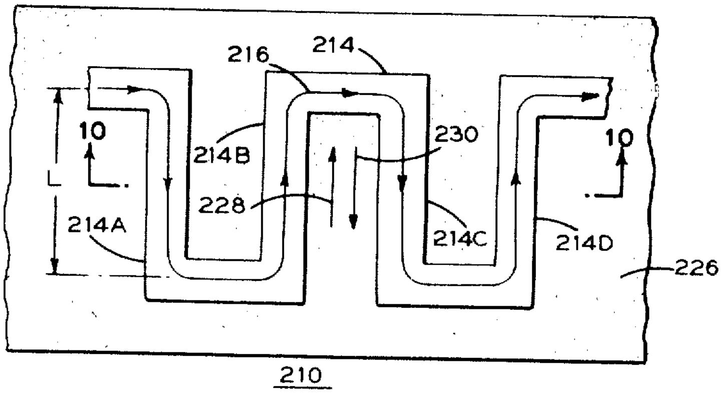
FIG. 9 is an enlarged top plan view of a portion of a memory element showing a signal conductor disposed on a self-latching ferrite element.
Figure 10:
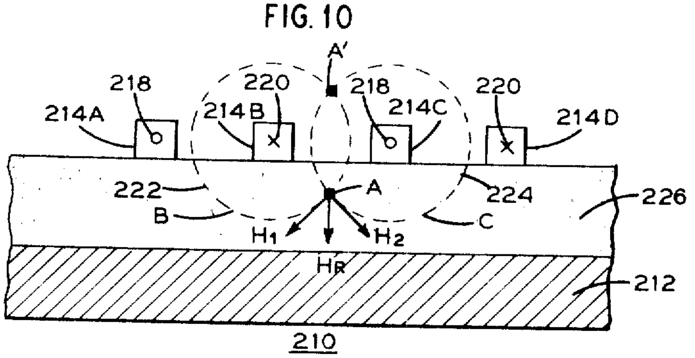
FIG. 10 is a sectional view, taken along the line 10—10 of FIG. 9, showing the preferred disposition of the signal conductor, the ferrite element, as well as the interacting field.

To summarize, in order to obtain a nonreciprocal phase-shift there must be a nonreciprocal interaction between the RF-magnetic field of the microwave energy flowing down a guided-microwave-energy path and the magnetic medium in the path to affect the permeability of the path. The nonreciprocal interaction can be obtained by generating a circularly polarized RF-magnetic field in a suitably magnetized magnetic medium. Such a condition can be produced by the circuit shown in FIGURES 9 and 10. In particular, the circuit 210 is shown comprising a planar ground-plane element 212 and a signal conductor 214 having convolution elements 214A, 214B, 214C and 214D. Ground-plane element 212 and signal conductor 214 are spaced from each other to provide a guided microwave-energy path which is known as a microstripline. When microwave energy is applied to the microstripline from the left side, current flows through signal conductor 214 as represented by the arrowheaded line 216 in FIG. 9 and the "dots" 218 and "crosses" 220 in the convolution elements 214A and 214D (FIG. 10). The RF-current through element 214B generates the conventional RF-magnetic field represented by circle 222 and the RF-current through element 214C generates the conventional RF-magnetic field represented by circle 224.

At the points A and A′, the RF-magnetic field $H_1$ arising from current through element 214B is spatially orthogonal to the RF-magnetic field $H_2$ arising from current through element 214C. The resultant magnetic field is represented by vector $H_R$. In order to cause vector $H_R$ to rotate or to produce a circularly-polarized, RF-magnetic field at point A the fields $H_1$ and $H_2$ must be 90° out of (time) phase. This condition is readily accomplished if the length L of each of the convolution elements 214A to 214D is an odd number of operating quarter wavelengths. When this is so, the resultant magnetic field is circularly polarized and vector $H_R$ can be assumed to rotate in a counterclockwise manner. Its axis of rotation is perpendicular to the plane of FIG. 10, passing through point A. It can be represented by a vector directed inward to the page of the figure. If current flow were in the opposite direction, the resulting magnetic field would be circularly polarized in a clockwise sense and its rotational vector representation would be directed outward of the page of the figure. Of course, it should be realized that magnetic fields produced by the current flowing in elements 214A and 214B, and elements 214C and 214D similarly interact and produce similarly circularly polarized RF-magnetic fields at points B and C, respectively. The fields are not shown, solely for the sake of simplicity.

In other regions, the relative time-phase between the currents falls off (or increases) linearly with distance from the midpoints of the elements and the type of polarization varies from circular at the center through elliptical to linear at the ends of the elements. However, the elliptical polarization has, in a sense, a circular component.

If now a magnetic element is placed in the region of rotational polarization and it is suitably magnetized; the interaction required for nonreciprocal phase-shifting is obtained. Accordingly, the magnetic element 226 is placed in the guided-microwave-energy path and in particular between signal conductor 214 and ground-plane element 212. When magnetic element 226 is magnetized in the same direction as the rotational vector representation of the circularly polarized-magnetic field there will be an interaction between the domains of the magnetic material; if in the opposite direction there will be no interaction. Four cases arise:

(1) Microwave energy is transmitted along the direction indicated by arrowheaded line 216 and the magnetization of the magnetic element is in the direction indicated by arrow 228. There is a phase-shift.

(2) Microwave energy is transmitted along the direction indicated by arrowheaded line 216 and the magnetization of the magnetic element is in the direction indicated by arrow 230. There is no phase-shift.

(3) Microwave energy is transmitted along a direction opposite to that indicated by line 216 and the magnetization of the magnetic element is in the direction indicated by arrow 228. There is no phase-shift.

(4) Microwave energy is transmitted along a direction opposite to that indicated by line 216 and the magnetization of the magnetic element is in the direction indicated by arrow 230. There is a phase-shift.

Figure 11:
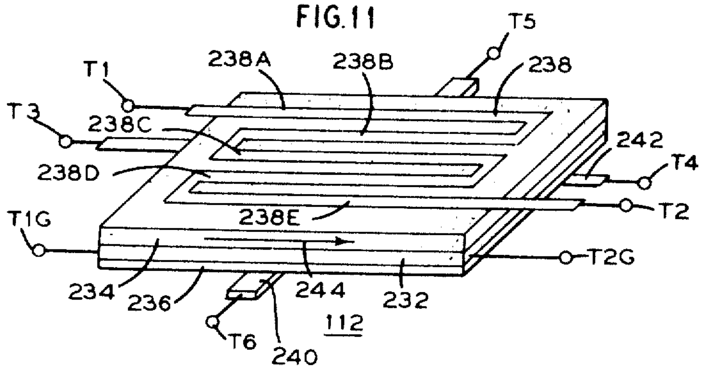
FIG. 11 is a perspective view of the memory element of FIGS. 9 and 10.

With this in mind, FIGURE 11 shows phase shifter 112 comprising planar ground-plane element 232, a planar self-latching-magnetic element 234, a signal conductor 238 and control conductors 240 and 242.

Signal conductor 238 is spaced from ground-plane element 232 to establish a guided-microwave-energy path which is known as a microstrip line. Microwave energy will propagate down the line in the TEM mode.

Signal conductor 238 has a transmission terminal T1, a plurality of serially connected convolution elements 238A to 238E and another transmission terminal T2. The convolution elements are in substantially parallel relationship and each is an odd number of operating quarter wavelengths long.

Magnetic element 234 is preferably disposed between ground-plane element 232 and signal conductor 238. While signal conductor 238 is shown as a wirelike conductor, it should be noted that it is preferable to "print" it directly on magnetic element 234.

Transmission terminals T1G and T2G are connected to ground-plane element 232 and are ground connection paths. Microwave signals may be applied to terminals T1 and T1G and received from terminals T2 and T2G and vice versa.

Magnetic element 234 can be a uni-axial oriented material such a Permalloy. The material has two stable states of remanent magnetization along the axis of arrow 244. One state is from the head of the arrow to the tail of the arrow. The other state is from the tail of the arrow to the head of the arrow. The element cannot change stable states unless coincidence current pulses pass through conductors 240 and 242. When a current pulse passes through conductor 242 the magnetization vector rotates in the plane of the ferrite less than 90° towards a direction orthogonal to the arrow. The application of a current pulse in conductor 240 will cause the magnetization vector to rotate either more or less than 90° depending on the direction of the current pulse. If the rotation is less than 90°, then when both current pulses disappear the remanent magnetization vector returns to its original direction. If the rotation is more than 90°, then when both current pulses disappear the remanent magnetization vector returns to a direction opposite its original direction.

Now consider the control conductors 240 and 242. Preferably, control conductor 240 is insulatively positioned against the bottom face of ground-plane element 232. That face may be covered with a layer of insulation 236 and conductor 240 is printed thereon. Control conductor 242 is similarly printed making sure that at the "crossover" of the two conductors 240 and 242 they are mutually insulated. In this arrangement of the control conductors it should be realized that the magnetic shielding introduced by ground-plane element 232 must not adversely interfere with the establishment of magnetic fields in the magnetic element 234 by the control conductors 240 and 242. Therefore, the ground-plane element is preferably made of aluminum or copper of minimum thickness.

Each of the control conductors 240 and 242 are provided with terminals for receiving control pulses. Control conductor 240 has terminals T5 and T6; and control conductor 242 has terminals T3 and T4.

It should be noted that in each case the thickness of the conductors, the magnetic elements and the ground-plane elements has been exaggerated. It should also be realized in each embodiment that the sheets of dielectric material are primarily provided to maintain the required configuration geometry of the conductors nad the ground-plane elements.

In building devices which are combinations of the couplers and other elements, the connections between the couplers and the elements has been shown idealized. However, it should be realized that conventional couplings, coaxial line or striplines can be employed. In many cases, it is fruitful to connect the couplers by microstriplines which are printed on the substrates from which the couplers and other elements are fabricated to form an integrated monolithic package.

There has thus been shown an improved contents addressable type memory, and components which operate on microwave signals. Such signal processing has many advantages.

Nondestructive readout of a magnetic memory element by sensing the phase shift induced by magnetic interaction with a microwave signal bypasses many classical memory design problems. This requires, of course, that phase coherence be maintained throughout the memory. However, the development of stripline transmission techniques has brought such a system well within the realm of practicality.

One obvious advantage of a microwave memory is its speed. A DC system is limited by the absolute bandwidth of its components, whereas only relative bandwidth counts in a carrier system. Of course, many operations in a microwave memory are limited by propagation delay in which case only a small fraction of the available bandwidth is used.

This excess bandwidth together with the phase coherence requirement leads to an even more significant advantage of a microwave memory: it can be frequency shared. For example, a 10 percent bandwith Q-band memory would have the same characteristics at any frequency in a 4 gc. band. One hundred users, each assigned a 40 mc. band, could perform memory searches completely independent of one another provided each user had his own filters and peripheral circuitry. Of course, users could not write into the memory independently, so a combination of time and frequency sharing would have to be used in the performance of more complex multiple user operations.

A third benefit accrues from the existence of information in a phase coherent form. For instance, if two or more words in the memory are illuminated by the same frequency, a read operation yields the sum of the words. Thus all that is required to perform binary addition is peripheral circuitry to resolve carries. On step multiplication of two or more words in the memory is accomplished in the following manner. The words are illuminated by different frequencies so that the result of a read operation is a pattern with each word on a different subcarrier. The discrete Fourier transform of the pattern is then taken by a passive $n$-port by $n$-port stripline feed structure known as a Butler matrix. Because of the linearity of a Butler matrix, the result is the sum of the Fourier transforms of the selected words in the memory. The resulting signals are then passed through square law devices and the products of the Fourier coefficients picked off by filtering at the appropriate frequency. The result is then transformed again by a second Butler matrix. The result is then convolution of the selected words and all that is required to obtain their binary product is peripheral circuitry to resolve carries. Many other noval data processing techniques are possible.

Another attractive feature of a microwave memory is that it is ideally suited for batch processing manufacturing techniques.

While only a limited number of embodiments of the invention have been shown and described in detail, there will now be obvious to those skilled in the art many modifications and variations which satisfy many or all other objects of the invention but which do not depart from the spirit thereof as defined by the appended claims.

What is claimed is:

1. An information bit memory cell comprising: a carrier-signal phase shifting means having two stable states, each representing one of two possible logic values of a stored information bit, for differentially shifting the phase of carrier signals passing therethrough in accordance with the then present stable state; said phase shifting means including first and second carrier-signal transfer terminals and recording terminal means, adapted to receive two-valued bit-recording signals, for switching said phase-shifting means between said two stable states in accordance with the value of the received bit-recording signal; a directional coupler having first and second pairs of ports; means for connecting one of the ports of said first pair of ports to said second carrier-signal transfer terminal; and a carrier-signal energy dissipation means connected to one of the ports of said second pair of ports; the other ports of each of said pair of ports and said first carrier-signal transfer being adapted to transfer different carrier signals.

2. The information bit memory cell of claim 1 wherein the first carrier-signal transfer terminal of said phase shifting means is adapted to receive an interrogating carrier signal having one of two phases each representing one of said two possible logic values, the other port of said first pair of ports is adapted to receive a reference carrier signal having a given one of said two phases and the other port of said second pair of ports is adapted to transmit a carrier signal in accordance with the then present stable state of said phase shifting means.

3. The information bit cell of claim 2 wherein said other port of said second pair of ports transmits a carrier signal only when the logic value represented by the then present state of said phase shifting means and the logic value represented by the phase of the interrogating carrier signal are different.

4. The information bit memory cell of claim 1 wherein said recording terminal means comprises a priming terminal means, adapted to receive a signal, for allowing said phase shifting means to switch stable states; and an information input terminal means adapted to receive a signal representing the logic value of the information bit to be recorded, for causing said phase shifting means to switch to the stable state associated with said logic value.

5. The information bit memory cell of claim 1 wherein the other port of said second pair of ports is adapted to receive an interrogating carrier signal, whereby said second carrier-signal transfer terminal and the other port of said first pair of ports transmit carrier signals when an interrogating carrier signal is received by said other port of said second pair of ports so that the state of said phase shifting means and the logic value of the information stored therein are indicated by the relative phases of the carrier signals transmitted by said second carrier signal transfer terminal and said other port of said first pair of ports.

6. The information bit memory cell of claim 1 wherein said phase shifting means includes a guided-microwave-energy path means extending between said carrier-signal transfer terminals and a self-latching magnetic element electromagnetically coupled to said path, said magnetic element being switchable between two stable states of remanent magnetization.

7. The information bit memory cell of claim 1 wherein said phase shifting means comprises at least one planar ground-phase element, a signal conductor having ends associated with said carrier-signal transfer terminals and disposed in a plane parallel to the plane of said ground-plane element, said signal conductor and said ground-plane element being spaced from each other in cooperating relation to provide a guided-microwave-energy path, and a planar self-latching magnetic element disposed parallel to the plane of said ground-plane element and electromagnetically coupled to the guided-microwave-energy path, said magnetic element being switchable between two stable states of remanent magnetization.

8. The information bit memory of claim 7 wherein said directional coupler has a stripline configuration.

9. The bit memory cell of claim 7 wherein said recording terminal means includes control signal conductor means disposed parallel to the plane of said magnetic element and inductively coupled thereto.

10. A memory plane comprising:

- a matrix of information bit memory cells arranged in *m* word lines and *n* bit lines, each of said information bit memory cells comprising
  - a carrier-signal phase shifting means having two stable states each representing one of two possible logic values of a stored information bit, for differentially shifting the phase of carrier signals passing therethrough in accordance with the then present stable state, said phase shifting means including,
    - first and second carrier-signal transfer terminals, a primary terminal means adapted to receive a signal, for allowing said phase shifting means to switch stable states, and
    - an information input terminal means, adapted to receive a signal representing the logic value of the information bit to be recorded, for causing said phase shifting means to switch to the stable state associated with said logic value,
  - a directional coupler having first and second pairs of ports,
  - means for connecting the first port of said first pair of ports to said second carrier-signal transfer terminal;
  - a carrier-signal energy dissipation means connected to the first port of said second pair of ports; and the second port of said first pair of ports being adapted to transfer a carrier signal,
  - *m* word carrier-signal transmission lines receiving a bit DC signal having a first or a second characteristic each associated with one of said logic values, for causing said phase shifting means to assume the stable state associated with the logic value represented by the characteristic of the received bit DC signal during the presence of a word DC signal, and
  - transfer control means for permitting the transfer of carrier signals received by said first carrier-signal-transfer terminal only when the logic value represented by the phase of the carrier signal received by said first carrier-signal transfer terminal is different from the logic value represented by the state of said phase shifting means;
- a plurality of word carrier-signal transmission lines, each associated with one of the word lines of the matrix;
- means for connecting the second carrier-signal-transfer terminals of the memory cells of each word line of the matrix to the associated word carrier-signal transmission line;
- a plurality of word DC signal lines, each associated with one of the word lines of the matrix;
- means for connecting the permission control input means of the memory cells of each word line of the matrix to the associated word DC signal line;
- a plurality of carrier-signal rectifier means, each connecting one of the word DC signal lines to the associated word carrier signal transmission line;
- means for connecting in parallel each of the second ports of said second pair of ports of the information bit memory cells in each word line of the matrix to one of the word-carrier-signal-transmission lines, respectively,
- *n* bit-carrier-signal-transmission lines,
- means for connecting in parallel each of the first carrier-signal transfer terminals of the information bit memory cells in each bit line of the matrix to one of the bit-carrier-signal-transmission lines, respectively,
- means for connecting in series each of the primary terminal means of the information bit memory cells in each word line of the matrix to one of the word-control-signal-transmission lines, respectively,
- *n* bit-control-signal-transmission lines, and
- means for connecting in series each of the information-input terminal means of the information bit memory cells in each bit line of the matrix to one of the bit-control-signal-transmission lines, respectively.

11. The memory plane of claim 10 wherein each of said *m* word-carrier-signal-transmission lines is adapted to receive an interrogation carrier signal whereby the second port of the first pair of ports and the second carrier-signal terminal of each of the bit memory cells in the associated word line of the matrix transmit carrier signals having a phase relationship dependent on the then present stable state of the phase-shifting means.

12. The memory plane of claim 10 wherein each of said *n* bit-carrier signal-transmission lines is adapted to receive a carrier signal having one of two phases, each of said phases representing one of said two logic values, each of the second ports of each of said pairs of ports of all of said bit memory cells being adapted to receive a carrier signal having a given one of said two phases whereby only signals are transmitted by the word-carrier-signal-transmission lines associated with those word line bit memory cells whose phase shifting means are in the stable state representing one of said two logic values having a predetermined relationship with the logic values represented by the phase of the carrier signals received by their associated first carrier-signal-transfer terminals.

13. The memory plane of claim 12 wherein the predetermined relationship is an inequality of logic values.

14. The memory plane of claim 10 wherein each of said phase shifting means includes a guided-microwave-energy path means extending between said carrier-signal transfer terminals and a self-latching magnetic element electromagnetically coupled to said path, said magnetic element being switchable between two stable states of remanent magnetization.

15. The memory plane of claim 10 wherein each of said phase shifting means comprises at least one planar ground-plane element, a signal conductor having ends associated with said carrier-signal transfer terminals and disposed in a plane parallel to the plane of said ground-plane element, said signal conductor and said ground-plane element being spaced from each other in cooperating relation to provide a guided-microwave-energy path, and a planar self-latching magnetic element disposed parallel to the plane of said ground-plane element and electromagnetically coupled to the guided-microwave-energy path, said magnetic element being switchable between two stable states of remanent magnetization.

16. The memory plane of claim 15 wherein each of said directional couplers has a stripline configuration.

17. A memory system for operating with words of information represented by coded combinations of bits having one of two logic values comprising: a matrix of memory cells arrayed in word lines and bit lines, each word line of memory cells being associated with an information word, the memory cells of at least one bit line of the matrix being the flag cells for the information words associated with the word line of the matrix, a plurality of the remaining memory cells of each word line of the matrix being the bit storage cells of the associated information word, each of said memory cells comprising:

first and second carrier-signal transfer terminals for transferring carrier signals having first or second phases related to said logic values, controllable phase shifting means connected between said first and second carrier-signal transfer terminals, said phase shifting means having two stable states each associated with one of said logic values, a permission control input means for allowing said phase shifting means to switch stable states during the receipt thereof of a word DC signal, a state control input means, a plurality of bit carrier-signal transmission lines, each associated with one of the bit lines of the matrix;

means for connecting the first carrier-signal transfer terminals of the memory cells of each bit line of the matrix to the associated bit carrier-signal transmission line;

a plurality of bit DC signal lines, each associated with one of the bit lines of the matrix; and means for connecting the state control input means of the memory cells of each bit line of the matrix to the associated bit DC signal line.

18. The memory system of claim 17 wherein said phase shifting means includes a guided-microwave-energy path means extending between said carrier-signal transfer terminals and a self-latching magnetic element electromagnetically coupled to said path, said magnetic element being switchable between two stable states of remanent magnetization.

19. The memory system of claim 17 wherein said phase shifting means comprises at least one planar ground-plane element, a signal conductor having ends associated with said carrier-signal transfer terminals and disposed in a plane parallel to the plane of said ground-plane element, said signal conductor and said ground-plane element being spaced from each other in cooperating relation to provide a guided-microwave-energy path, and a planar self-latching magnetic element disposed parallel to the plane of said ground-plane element and electromagnetically coupled to the guided-microwave-energy path, said magnetic element being switchable between two stable states of remanent magnetization.

20. The memory system of claim 19 wherein said transfer control means comprises a directional coupler having a stripline configuration.

21. The memory system of claim 19 wherein such permission control input means and said control input means include control signal conductor means disposed parallel to the plane of said magnetic element and inductively coupled thereto.

22. The memory system of claim 17 further comprising means for transmitting a flag bit DC signal having said second characteristic to the bit DC signal associated with said flag cells, and means for transmitting a word carrier signal to selected ones of said word carrier-signal transmission lines whereby the phase shifting means of the flag cells associated with the word lines whose word carrier-signal transmission lines receive the carrier signal switch to the second stable state from the first stable state.

23. The memory system of claim 22 further comprising means, operating after the transmission of said flag bit DC signal and said word carrier signal, for transmitting a bit carrier signal having a phase related to said second logic value to the bit carrier-signal transmission line associated with said flag cells whereby the word carrier-signal transmission lines associated with the flag cells whose phase shifting means are in the first stable state receive said bit carrier signal which is then transferred via the bit storage cells of the associated word lines of the matrix to the bit carrier-signal transmission lines associated with said bit storage cells for indicating by the phases of the carrier signals on said bit carrier-signal transmission lines the stable states then present in said bit storage cells.

24. The memory system of claim 23 wherein all but one of said word carrier signal transmission lines receives a word carrier signal so that the phase shifting means of only one of said flag cells switches to the second stable state and consequently only the states of the bit storage cells of one word line are indicated.

25. The memory system of claim 22 further comprising means, operating after the transmission of said word carrier signal and said flag bit DC signal for transmitting a bit carrier-signal having a phase related to said second logic value to the bit carrier-signal transmission line associated with said flag cells and for transmitting bit DC signals having coded combinations of said first and second characteristics to the bit DC signal lines associated with said bit storage cells whereby the phase shifting means of the bit storage cells associated with the word lines whose flag cells are then in the first stable state are driven to the stable states having logic values related to the logic values represented by the characteristics of the bit DC signals on the associated bit DC signal line.

26. The memory system of claim 25 wherein all but one of said word carrier-signal transmission lines receives a word carrier-signal so that the phase shifting means of only one of said flag cells switches to the second stable state and consequently only the states of the bit storage cells of one word line are affected.

27. The memory system of claim 17 further comprising means for transmitting a flag bit DC signal having said second characteristic to the bit DC signal line associated with said flag cells, and means for transmitting bit carrier signals having either of said two phases to selected ones of the bit carrier-signal transmission lines associated with the bit lines of said bit storage cells whereby the flag cells, associated with the word lines whose bit storage cells' phase shifting means have logic values which differ from the logic values represented by the then present associated bit carrier signals, switch to the second stable state from the first stable state.

28. The memory system of claim 27 further comprising means, operating after the transmission of said bit carrier signals and said flag DC signal, for transmitting a bit carrier-signal having a phase related to said second logic value to the bit carrier-signal transmission line associated with said flag cells and for transmitting bit DC signals having coded combination of said first and second characteristics to the bit DC signal lines associated with said bit storage cells whereby the phase shifting means of the bit storage cells associated with the word lines whose flag cells are then in the first stable state are driven to the stable states having logic values related to the logic values represented by the characteristics of the bit DC signals on the associated bit DC signal lines.

29. The memory system of claim 17 wherein the bit carrier-signal transmission line serially connects all of the flag cells and further comprising means for transmitting a flag bit DC signal having said second characteristic to the bit DC signal line associated with said flag cells, and means for transmitting bit carrier signals having either of said two phases to selected ones of the bit carrier-signal transmission lines associated with the bit lines of said bit storage cells whereby the flag cells, associated with the word line whose bit storage cells' phase shifting means have logic values which differ from the logic values represented by the then present associated bit carrier signals, switch to the second stable state from the first stable state.

30. The memory system of claim 29 further comprising means, operating after the transmission of said flag bit DC signal and said bit carrier signals, for transmitting a bit carrier signal having a phrase related to said second logic value to the bit carrier signal transmission line associated with said flag cells, said bit carrier signal transmitting means being connected to one end of said bit carrier-signal transmission line associated with said flag cells whereby the bit carrier signal is transferred to the word carrier-signal transmission line associated with the flag cell closest to said bit carrier-signal transmission means which has a phase shifting means in the first stable state.

31. An encoder-decoder for operating with carrier signals having one of two phases representing one of two logic values comprising: a matrix of intermixed first and second carrier-signal transfer elements arrayed in rows and columns, each of said first transfer elements comprising
- first and second carrier-signal transfer terminals, and
- a transfer control means, connected between said first and second carrier-signal transfer terminals for permitting the transfer of carrier signals from said first carrier-signal transfer terminal to the said second carrier-signal transfer terminal only when a carrier signal received at said first carrier-signal-transfer terminal has said second phase;

each of said second transfer elements comprising
- a phase shifter having first and second signal transfer terminals for changing the phase of a carrier signal passing therethrough from one to the other of said two phases,
- a transfer control means having first and second signal transfer terminals for permitting the transfer of carrier signals from its first terminal to its second terminal only when the carrier signal received at its first terminal has said second phase,
- means for connecting the second signal transfer terminal of said phase shifter to the first signal transfer terminal of said transfer control means,
- said first signal transfer terminal of said phase shifter being a first carrier-signal-transfer terminal,
- and said second signal transfer terminal of said transfer control means being a second carrier-signal-transfer terminal;

a plurality of row carrier-signal transmission lines;
means for connecting the second carrier-signal-transfer terminals of the carrier-signal transfer elements in each row of the matrix to one of said row carrier-signal transmission lines, respectively;
a plurality of column carrier-signal lines, and
means for connecting the first carrier-signal transfer terminals of the carrier-signal transfer elements in each column of the matrix to one of said column carrier-signal transmission lines, respectively.

32. The encoder-decoder of claim 31 further comprising means for transmitting in parallel a plurality of carrier signals having a coded combination of said phases to said column carrier-signal-transmission lines whereby carrier signals are transmitted by at least one of said row carrier-signal transmission lines.

33. A concident-current memory element comprising at least one planar ground-plane element, a single signal conductor disposed in a first plane parallel to the plane of said ground-plane element, said signal conductor and said ground-plane element being spaced from each other in cooperating relation to provide a guided-microwave-energy path, said signal conductor being so contoured to establish within a given region a radiofrequency-magnetic field having a component which is circularly polarized, the rotational axis of the circular polarized component being directed along a first line in a second plane parallel to the plane of said ground-plane element, a self-latching magnetic element disposed to include said given region, coincident-current magnetization-switching means for selectively switching the remnanet magnetization of said magnetic element between opposite senses at least along said first line, and first and second microwave-energy transmission means disposed at one end of said signal conductor and said ground-plane element, and at the other end of said signal conductor and said ground-plane element respectively.

34. The coincident current-memory element of claim 33 wherein said signal conductor is formed by a plurality of serially connected convolution elements which are in adjacent, substantially parallel relationship, each of said convolution elements being an odd number of operating quarter wavelengths.

35. The coincident-current memory element of claim 34 wherein said magnetic element is planar and self-latching, and said coincident-current magnetization-switching means comprises a first control conductor disposed in a plane parallel to the plane of said magnetic element and directed along a line perpendicular to said convolution elements, and a second control conductor disposed in a plane parallel to the plane of said magnetic elements, one of said control conductors being adapted to receive electric-current pulses having at least a first polarity and the other of said control conductors being adapted to receive electric-current pulses having first or second polarities.

36. The coincident-current memory element of claim 34 wherein said magnetic element is of a uni-axial oriented material, and is planar and disposed between said ground-plane element and said signal conductor.

37. The coincident-current memory element of claim 36 wherein said magnetic element is planar and disposed on said ground-plane element and said signal conductor is printed on said magnetic element.

38. The coincident-current memory element of claim 37 wherein said magnetic element is a film of uni-axial oriented magnetic material printed on said ground-plane element.

References Cited

UNITED STATES PATENTS

| | | |
|---|---|---|
| 3,212,064 | 10/1965 | Krieger. |
| 3,257,629 | 6/1966 | Kornreich. |
| 3,278,905 | 10/1966 | McAteer. |
| 3,283,313 | 11/1966 | Hathaway. |
| 3,284,872 | 11/1966 | Burns. |
| 3,289,169 | 11/1966 | Marosz. |
| 3,292,161 | 12/1966 | Broadbent. |
| 3,298,000 | 1/1967 | Sanders. |
| 3,311,897 | 3/1967 | Post. |
| 3,334,336 | 8/1967 | Koerner et al. |

PAUL J. HENON, *Primary Examiner.*

H. E. SPRINGBORN, *Assistant Examiner.*

U.S. Cl. X.R.

333—31, 84; 340—174

UNITED STATES PATENT OFFICE

CERTIFICATE OF CORRECTION

Patent No. 3,445,821 May 20, 1969

Luther D. Rudolph et al.

It is certified that error appears in the above identified patent and that said Letters Patent are hereby corrected as shown below:

In the drawings sheet 2, Fig. 5, " $\boxed{\pi D}$ " should read -- $\boxed{\pi^{o}}$ --. Column 1, line 67, "back" should read -- track --. Column 5, line 46, "row" should read -- column --. Column 9, line 51, "-1" should read -- +1 --. Column 10, line 44, "$0^{o}$" should read -- $0\phi$ --; line 55, "$\pi$" should read -- $\pi\phi$ --; line 58, "$\pi$" should read -- $\pi\phi$ --. Column 16, line 27, "On" should read -- One --; line 41, "then" should read -- the --; line 43, "noval" should read -- novel --; line 72, after "transfer" insert -- terminal --. Column 17, line 45, "ground-phase" should read -- ground-plane --; line 56, after "memory" insert -- cell --. Column 21, line 17, "combination" should read -- combinations --; line 34, "line" should read -- lines --. Column 22, line 17, after "signal" insert -- transmission --; line 37, "circular" should read -- circularly --.

Signed and sealed this 12th day of January 1971.

(SEAL)
Attest:

EDWARD M.FLETCHER,JR.
Attesting Officer

WILLIAM E. SCHUYLER, JR.
Commissioner of Patents